United States Patent [19]
Okamura

[11] Patent Number: 5,412,790
[45] Date of Patent: May 2, 1995

[54] HIGH-THROUGHPUT DATA PROCESSING SYSTEM EQUIPPED WITH CACHE MEMORY SYSTEM FOR ACHIEVING HIGH HIT RATIO

[75] Inventor: Atsushi Okamura, Tokyo, Japan

[73] Assignee: NEC Corporation, Tokyo, Japan

[21] Appl. No.: 879,314

[22] Filed: May 7, 1992

[30] Foreign Application Priority Data

May 17, 1991 [JP] Japan .................................. 3-112035

[51] Int. Cl.6 .............................................. G06F 12/12
[52] U.S. Cl. .................................. 395/425; 364/957.9; 364/DIG. 1
[58] Field of Search ... 364/200 MS File, 900 MS File; 395/400 MS File, 425 MS File

[56] References Cited
U.S. PATENT DOCUMENTS

| | | | |
|---|---|---|---|
| 4,476,525 | 10/1984 | Ishii | 364/200 |
| 4,967,338 | 10/1990 | Kiyohara et al. | 364/200 |
| 5,091,846 | 2/1992 | Sachs et al. | 395/250 |
| 5,113,515 | 5/1992 | Fite et al. | 395/425 |
| 5,168,557 | 12/1992 | Shibuya | 395/375 |
| 5,265,213 | 11/1993 | Weiser et al. | 395/375 |

*Primary Examiner*—Reba I. Elmore
*Attorney, Agent, or Firm*—Sughrue, Mion, Zinn, Macpeak & Seas

[57] ABSTRACT

A cache memory system immediately supplies data codes to a central processing unit, and new data codes are written from the central processing unit into the cache memory system so as to enhance the hit ratio. The new data codes are transferred to a main memory system while there are no predicted bus requests or communication between the central processing unit, the main memory system, and the cache memory system, so that data throughput is improved without negatively affecting the hit ratio.

6 Claims, 3 Drawing Sheets

HIGH-THROUGHPUT DATA PROCESSING SYSTEM EQUIPPED WITH CACHE MEMORY SYSTEM FOR ACHIEVING HIGH HIT RATIO

FIELD OF THE INVENTION

This invention relates to a data processing system and, more particularly, to a high hit ratio cache memory system incorporated in the data processing system.

DESCRIPTION OF THE RELATED ART

High data throughput is one of the important characteristics of a data processing system, and a cache memory system achieves high data throughput. The cache memory system is usually provided between a central processing unit and a main memory system, and is a small temporary data storage system apart from the main memory system. The cache memory system temporally stores a relatively small number of data codes selected from a large number of data codes in the main memory system, so that when the central processing unit (CPU) attempts to access these data codes from memory, the cache memory system can immediately supply the needed data codes to the CPU. When the central processing unit fetches a data code from the main memory system, the data code and the address assigned thereto are written into the cache memory system, and thereafter, the data is supplied from the cache memory system to the central processing system if the central processing unit again accesses that data code. Since the central processing system does not need to establish a data path to the main memory system, the data fetch is completed within a short time period, and data throughput is improved.

Cache memory systems are broken down into three categories: a direct mapping memory system, a set-associative addressing memory system, and a full-associative addressing memory system. The direct mapping system is economical, and the full-associative addressing technique is attractive in view of searching speed.

FIG. 1 is a typical example of the prior art cache memory system. The prior art cache memory system 1 comprises an effective address input port 2, a cache memory unit 3, a comparator 4 and a cache memory sequencer 5. The cache memory system 1 is communicable with a main memory system 6 and a central processing unit (not shown), so that an accessed data code DC1 may be supplied from either cache or main memory system 1 or 6 to the central processing unit. In order to fetch the data code DC1, the central processing unit supplies an effective address code ADD1. The effective address code ADD1 is constituted by a tag data field TG1 indicative of a tag, an index data field ID1 for index data indicative of a data block, and a displacement data field DP1 indicative of a displacement in the data block.

The cache memory unit 3 stores a plurality of data blocks 31 to 3n each having a plurality of data codes. Each of the data blocks 31 to 3n is associated with a tag TG2, a validity flag VF1 and a dirty flag DF1. Using the index data in the index data ID1, the cache memory unit 3 is examined to see whether or not it stores the data block indicated by the index data in the index data field ID1 of the effective address code ADD1. Tag TG2 is compared with tag TG1 of the effective address code ADD1 at the comparator 4 to see whether or not a data code in the selected data block is identical with the data code in the main memory system 6 assigned the effective address. When the data processing unit rewrites a data code of one of the data blocks 31 to 3n in the cache memory unit 3, the associated dirty flag DF1 is set. The dirty flag DF1 of logic "1" level is indicative of a discrepancy in data codes between the cache memory unit 3 and the main memory system 6. The validity flag VF1 is indicative of validity of data codes in the cache memory unit 3. The cache memory sequencer 5 controls data transfer between the main memory system 6 and the cache memory unit 3 if the data code indicated by the effective address is not available from the cache memory unit 3, and a write back algorithm is employed in this instance. Accordingly, if a new data code is produced in the central processing unit, the new data is written into the cache memory unit 3. However, if a cache memory system is controlled in accordance with a write through algorithm, a new data code is written into a main memory system, and, for this reason, the hit ratio of the write back algorithm is usually higher than that of the write through algorithm.

The prior art cache memory system 1 thus arranged behaves as follows. FIG. 2 shows a control sequence for the prior art cache memory system 1 in accordance with the direct mapping technique; however, if a two-way set associative addressing technique is employed, index data is distributed to a cache memory unit divided into two sub-units, and the two sub-units are simultaneously accessed with the index data. Assuming now that the central processing unit tries to access a data code as in step S1, the central processing unit supplies the effective address code ADD1 (indicative of the effective address assigned to the data code) to the address input port 2. Using the index data of the effective address code ADD1 as address information, one of the data blocks 31 to 3n is selected from the cache memory unit 3 in step S2, and the tag TG2 and the validity flag VF1 associated with the selected data block are sequentially checked at step S3 to see whether or not the data code in the selected data block is available. If the answer at step S3 is negative, the data block in the cache memory unit 3 is invalid, and the cache memory sequencer 5 is requested in step S4 to transfer data codes of the data block indicated by the index data from the main memory system 6 to the cache memory unit 3. On the other hand, if the answer at step S3 is affirmative, the data block in the cache memory unit 3 is valid, and the selected data block is checked at step S5 to see whether or not the data code to be accessed with the effective address is readable from the selected data block. If the answer at step S5 is affirmative, the access with the effective address is determined to be "hit", and is checked at step S6 to see whether a read-out or a write-in is requested. If the read-out is requested, the data code is read out from the cache memory unit 3 to the central processing unit, in step S7, without any data transfer between the main memory system 6 and the cache memory unit 3. If, on the other hand, the write-in is requested, a new data code is written into the effective address in step S8, and the dirty flag DF1 associated with the selected data block is set to logic "1" in step S9. However, if the answer at step S5 is negative, the access with the effective address is determined to be "mishit", and at step S10 the dirty flag DF1 associated with the selected data block is checked to see whether or not a data write-in has been carried out. If no data write-in has been carried out, the data code assigned the effective address in the cache memory unit 3 is identical with the corresponding data code in the main memory system 6, and the data transfer at step S4 is directly requested. On the other hand, if the answer at step S10 is affirmative, there is a discrepancy between the data code assigned the effective address in the cache memory unit 3 and the corresponding data code in the main memory system 6, so the data code in the cache memory unit 3 is saved in the main memory system 6 in step S11. Thereafter, the data transfer is carried out at step S4, and control proceeds to step S6.

Since a new data code is first written into the cache memory unit 3 in accordance with the write back algorithm, the prior art cache memory system 1 achieves a relatively high hit ratio. However, if the dirty flag DF1 is indicative of a new data code, the data codes are transferred to the main memory system 6 in step S11, and the bus request is repeated for the data transfer. The bus request may be in conflict with another bus request of another component unit of the data processing system, and the conflict retards the data transfer to the main memory system. This results in deterioration of the data throughput.

SUMMARY OF THE INVENTION

It is therefore an important object of the present invention to provide a cache memory system which achieves high data throughput without sacrifice of the hit ratio.

To accomplish the object, a data processing system according to the present invention transfers new data codes while no bus request is predicted.

A pre-fetch cue register selectively stores a plurality of instruction codes. A data register stores a data code that serves as either an operand data code or a new data code. A first instruction decoder sequentially supplied with the instruction codes produces control signals for achieving a task represented by the instruction codes. A main memory system stores the instruction codes and data codes. A cache memory system stores a number of data blocks each storing a number of data codes, and communicates with the data register and the main memory system through a first bus and a second bus, respectively. A second instruction decoder operative to check instruction data codes stored in the pre-fetch cue register to see whether or not the communication between the data register, the main memory system, and the cache memory system is predicted. The second instruction decoder checks the instruction codes stored in the pre-fetch cue register to see whether or not a bus request for at least one of the first and second buses is predicted. A pointer supplies an auxiliary address code indicative of one of the data blocks storing the data codes to the cache memory system, while there is no predicted communication between the data register, the main memory system, and the cache memory system. The cache memory system checks the data blocks sequentially indicated by the auxiliary address code to see whether or not at least one of the plurality of data codes is supplied from the data register. The cache memory system transfers at least one of the data codes to the main memory system in the absence of any predicted communication between the data register, the main memory system, and the cache memory system and of the bus request.

BRIEF DESCRIPTION OF THE DRAWINGS

The features and advantages of the cache memory system according to the present invention will be more clearly understood from the following description taken in conjunction with the accompanying drawings in which.

DESCRIPTION OF THE PREFERRED EMBODIMENT

Figure 1:
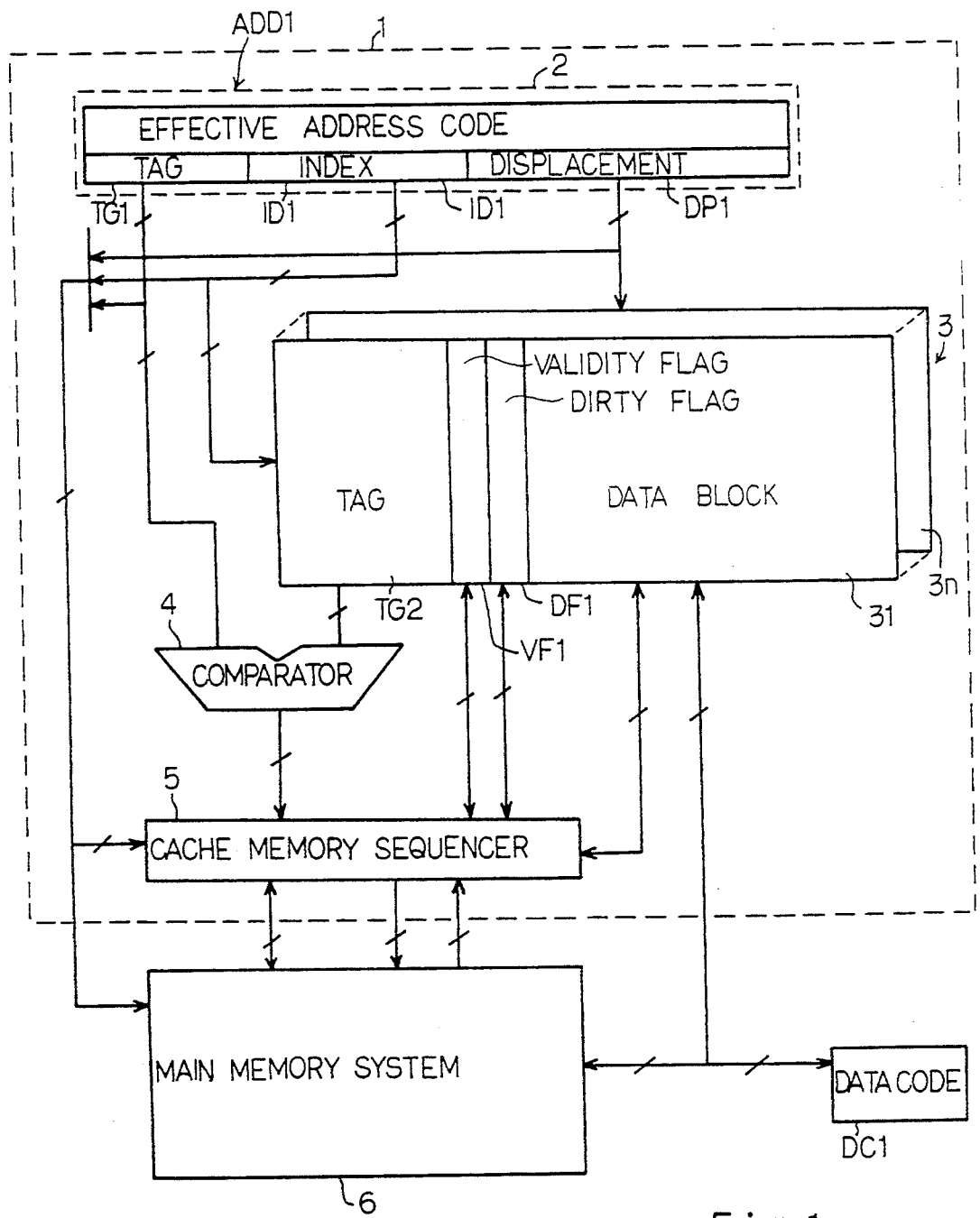
FIG. 1 is a block diagram showing the arrangement of a prior art cache memory system.
Figure 2:
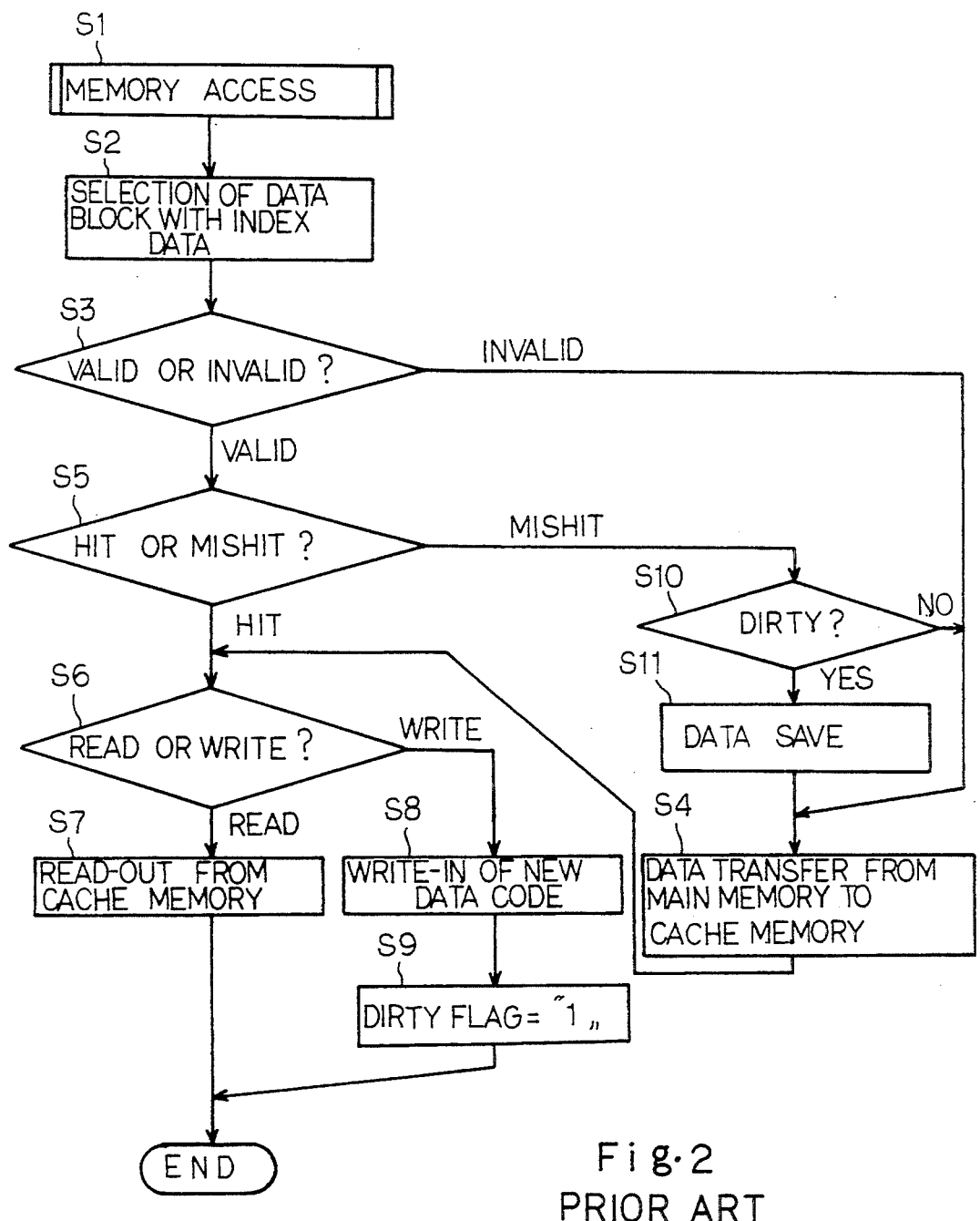
FIG. 2 is a flow chart showing the sequence of memory access in a cache memory system.
Figure 3:
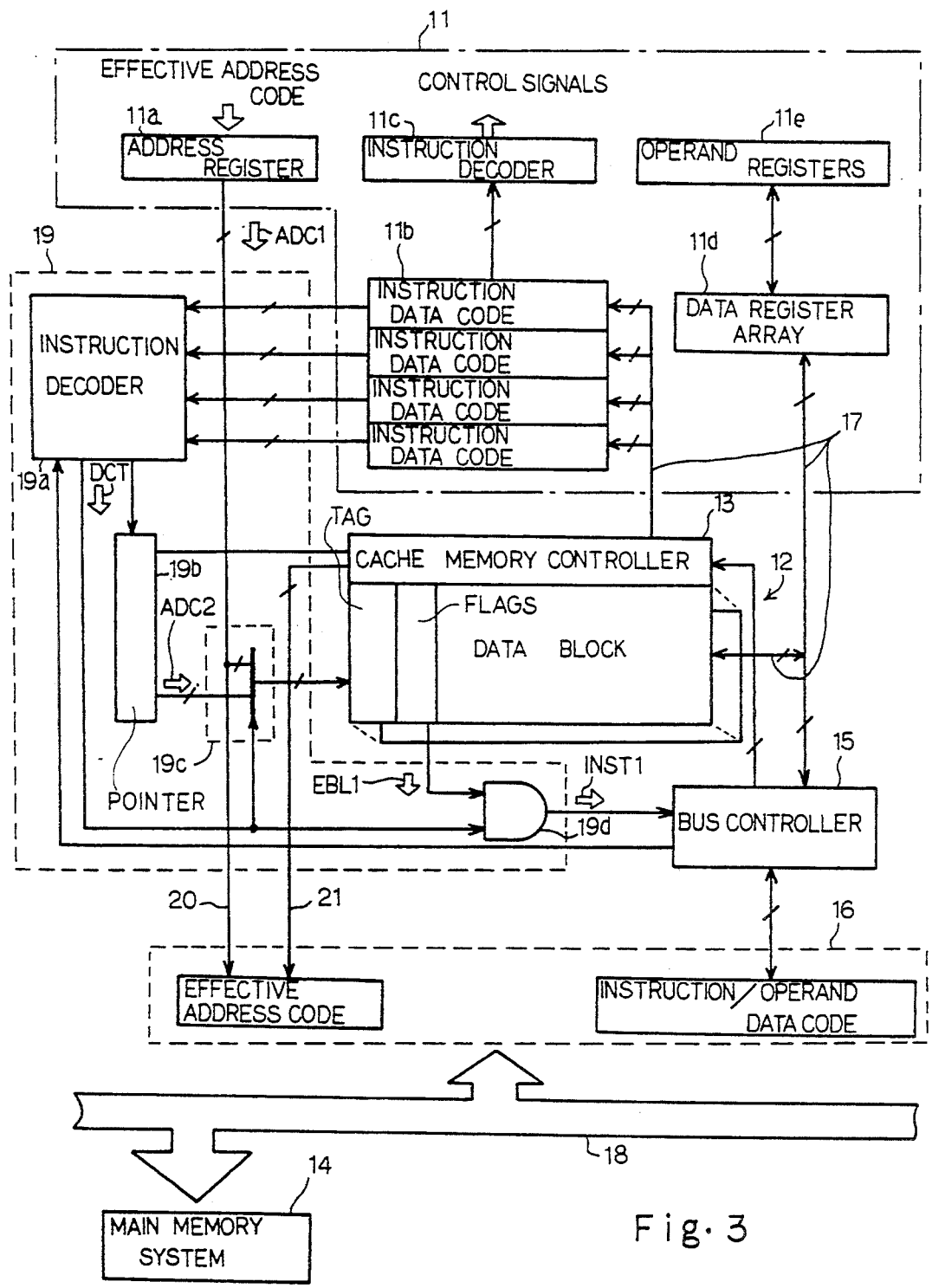
FIG. 3 is a block diagram showing the arrangement of a cache memory system according to the present invention.

Referring to FIG. 3 of the drawings, a data processing system embodying the present invention comprises a central processing unit 11, a cache memory unit 12 provided in association with the central processing unit 11, a cache memory controller 13 for controlling communication between the central processing unit 11, the cache memory unit 12, and a main memory system 14, a bus controller 15 for controlling a bus interface 16 between an internal bus system 17 and an external bus system 18, and a purge controller 19 for requesting data transfer of new data codes or a purge operation to the bus controller 15. In this instance, the cache memory unit 12 is organized in accordance with a direct mapping configuration. The internal data bus system 17 transfers data codes, i.e. both instruction and operand data codes, between the main memory system 14, the cache memory unit 12 and the central processing unit 11.

The central processing unit 11 is implemented by various component circuits; however, only several component circuits are illustrated in FIG. 3 for better understanding of the present invention. The central processing unit 11 comprises an address register 11a, and an effective address code ADC1 is supplied from the address register 11a through an address bus system 20 to the purge controller 19 and the bus interface 16. The effective address code ADC1 is formatted into the same configuration as that of the prior art, i.e., a tag data field, an index data field and a displacement data field. The central processing unit 11 further comprises a four stage pre-fetch cue register 11b, and instruction data codes are sequentially supplied from the cache memory unit 12 through the internal bus system 17 to the pre-fetch cue register 11b. As will be described below, the internal bus system 17 is coupled in parallel with the four stages of the pre-fetch cue register 11b, and instruction codes stored in the four stages can be concurrently canceled upon execution of a branch instruction. The instruction code is transferred from the pre-fetch cue register 11b to an instruction decoder 11c, and is decoded so as to produce various control signals distributed to the component circuits of the central processing unit. By means of the control signals, an instruction indicated by the instruction code is executed by the central processing unit 11. The central processing unit 11 further comprises a data register array 11d, which stores operand data codes supplied from the cache memory unit 12. The operand data codes are transferred from the data register array 11d to operand registers 11e of an arithmetic and logic unit, and the arithmetic and logic unit operates on the operand registers 11e in accordance with the instruction code. If a new data code is produced through the execution of an instruction code, the new data code may be fed back to the main memory system 14. In this situation, the new data code is first supplied to the data register array 11d, and then, the data register array 11d transfers the new data code to the cache memory unit 12 through a purge operation. Thus, the data processing system according to the present invention memorizes new data codes in accordance with a write-back controlling algorithm, and accordingly, the new data codes are supplied from the cache memory unit 12 to the main memory system 14 while the internal and external bus systems 17 and 18 stand idle, as will be described below.

The cache memory unit 12 stores a plurality of data blocks, and each data block is accompanied by a tag, a validity flag, and a dirty flag, in a manner similar to the data block of the prior art cache memory unit 3. The tag accompanying the data block is indicative of a piece of address information, and is matched with the tag in the tag data field of an effective address code if an accessed data block is stored in the cache memory unit 12. The validity flag indicates whether the data block is valid or invalid, and the dirty flag is indicative of the presence of a new data code which has not yet been transferred to the main memory system 14. The cache memory controller 13 has a comparator and a cache memory sequencer, and allows the cache memory unit 12 to supply instruction data codes and operand data codes to the central processing unit 11. The cache memory controller 13 further controls data swapping between the main memory system 14 and the cache memory unit 12, and traces the sequence of a write-back algorithm for carrying out the purge operation or data transfer of new data codes to the main memory system. For this reason, the cache memory controller 13 supplies address information through a purge address bus system 21 and the external bus system 18 to the main memory system 14 for the purge operation.

The purge controller 19 supervises a scanning sequence on the data blocks as well as the purge operation on new data codes, and comprises an instruction decoder 19a coupled with the four stage pre-fetch cue register 11b, a pointer 19b for producing an auxiliary address code ADC2 sequentially indicating the data blocks of the cache memory unit 12, a multiplexer 19c for selectively supplying the effective address code ADC1 and the auxiliary address code ADC2 to the cache memory unit 12, and an AND gate 19d coupled with the instruction decoder 19a as well as the cache memory unit 12 for producing a purge instruction signal INST1. The purge instruction signal INST1 is supplied to the bus controller 15, and the bus controller 15 allows the cache memory controller 13 to carry out the purge operation on new data codes stored in the cache memory unit 12 in the presence of the purge instruction signal INST1.

In detail, assuming now that each of the instruction data codes stored in the pre-fetch cue register 11b is executable within a single clock cycle, the instruction codes stored in the pre-fetch cue register 11b are decoded by the instruction decoder 19a, and the instruction decoder 19a monitors the instruction data codes to see whether or not the central processing unit 11 accesses any one of the data blocks. While the central processing unit 11 communicates with the cache memory unit 12, the instruction decoder 19a supplies a control signal to the multiplexer 19c, and the effective address code is transferred to the cache memory unit 12 as well as the cache memory controller 13. Therefore, the cache memory controller 13 supervises data transfer from the cache memory unit 12 to the central processing unit 11, or data swapping followed by the data transfer to the central processing unit 11. However, if the instruction decoder 19a finds that the cache memory unit 12 stands idle or is free from any read-out and write-in operation, the instruction decoder 19a allows the pointer 19c to increment the auxiliary address code ADC2, and the multiplexer 19c changes the data path from the pointer 19b to the cache memory unit 12 with the control signal supplied from the instruction decoder 19a. Since the auxiliary address code ADC2 is indicative of one of the data blocks in the cache memory unit 12, the dirty flag of the selected data block is supplied to the cache memory controller 13, and is examined to see if any one of the data codes is rewritten by the central processing unit 11. If the dirty flag is indicative of absence of any new data code, the cache memory controller 13 allows the pointer 19b to increment the auxiliary address code ADC2, and the cash memory controller 13 examines the next data block. Thus, the data blocks of the cache memory unit 12 are sequentially examined to see whether or not any data code is rewritten by the central processing unit 11 while the cache memory unit 12 stands idle with respect to the central processing unit 11. However, if a data code has been rewritten by the central processing unit 11, the cache memory controller 13 does not allow the pointer 19b to increment the auxiliary address code ADC2, and, for this reason, the pointer 19b continues to maintain the auxiliary address code indicative of the data block with the new data code. Upon discrimination of the presence of the new data code, the cache memory controller 13 supplies an enable signal EBL1 of logic "1" level to the AND gate 19d.

The instruction decoder 19a monitors the pre-fetched instruction codes further to see whether or not one of the instruction data indicates an upcoming external bus request. If an external bus request is predicted, the "any detection" signal (DCT) of logic "1" level is not produced, and, accordingly, the AND gate does not produce any purge instruction signal INST1. In this situation, the internal bus system 17 and the external bus system 18 are available for the data transfer between the central processing unit 11, the cache memory unit 12 and the main memory system 14. If a branch instruction is stored in the pre-fetch cue register 11b, any bus request indicated by a pre-fetched instruction data code is not considered predicted, because a set of new instruction data codes will be loaded into the pre-fetch cue register 11b upon execution of the branch instruction. For this reason, the instruction decoder 19a never produces the detection signal DCT of logic "1" level.

However, if no external bus request is predictable and, concurrently, the cache memory unit 12 is free from any read-out and write-in operation, the instruction decoder 19a supplies the detection signal DCT of logic "1" level, and the detection signal DCT of logic "1" level is ANDed with the enable signal EBL1 of logic "1" level so as to produce the purge instruction signal INST1 of logic "1" level. With the purge instruction signal INST1, the bus controller 15 allows the cache memory controller 13 to carry out the purge operation in accordance with the write back algorithm. Upon completion of the purge operation, the cache memory controller 13 resets the dirty flag of the data block, and the cache memory controller 13 restarts to sequentially check the data blocks to see whether or not any new data code is rewritten by the central processing unit 11.

If each of the instruction data codes stored in the pre-fetch cue register 11b is executable over a plurality of clock cycles, only the instruction code in the front stage is supplied to the instruction decoder 19a, and the instruction decoder 19a checks the instruction data code to see whether or not a bus request is predictable. If the answer is negative, the purge operation is carried out for new data codes stored in the data block indicated by the pointer 19b.

If a cache memory unit is implemented by 16 bytes×1000 blocks=16 kilo-bytes, the mis-hit ratio of the prior art cache memory system is usually of the order of 15 per cent. New data codes written by the central processing unit is usually assumed to be about 50 percent of the data blocks, and the purge operation is requested for about 8 percent of the data blocks upon occurrence of mis-hit. Since the purge operation consumes twice as much time as a usual data access, data throughput is decreased by about 8 percent compared with data access without any purge operation. However, the cache memory system according to the present invention completes most of the purge operations while the bus systems are open, and the purge operation upon occurrence of the mis-hit is negligible. Therefore, the data throughput is increased without negatively affecting the hit ratio.

Table 1 shows a simulation wherein memory access instructions are estimated at 30 percent of the program sequence to be executed. Each arithmetic instruction code without any memory access is executable within a single clock cycle, and a 32-bit memory access instruction code is completed within a single clock cycle in case of cache-hit. The 32-bit memory access instruction is assumed to need 2 clocks. On the other hand, if mis-hit takes place in the memory access, the memory access instruction without any purge operation consumes 8 clock cycles, and the memory access instruction with a purge operation consumes 16 clock cycles.

TABLE 1

| Instruction Code | Frequency | Clock Cycle |
|---|---|---|
| Arithmetic/Logical Instruction Load/Save Instruction | 70% | 1 |
| Cache Hit | 25.5% | 1 |
| Cache Mis-hit | | |
| Purge Operation | 2.4% | 16 |
| Non-purge operation | 2.6% | 8 |

Average clock cycles AV1 for the prior art system is calculated as $$AV1 = 1 \times 0.955 + 16 \times 0.024 + 8 \times 0.026 = 1.547$$

On the other hand, average clock cycles AV2 for the system according to the present invention is given as $$AV2 = 1 \times 0.955 + 8 \times 0.024 + 8 \times 0.026 = 1.355$$

Thus, the data processing system according to the present invention is improved in operation speed by $(1,547/1.355 - 1 = 14.2\%$.

As will be understood from the foregoing description, the new data are transferred to the main memory system 14 while the cache memory unit 12 and the internal and external bus systems 17 and 18 stand idle, and the data throughput is increased without sacrifice of the hit ratio.

Although particular embodiments of the present invention have been shown and described, it will be obvious to those skilled in the art that various changes and modifications may be made without departing from the spirit and scope of the present invention. For example, the embodiment above stores both instruction and operand data codes in the cache memory system; however, either instruction or operand data may be stored therein. In an implementation, the central processing unit, and the purge controller may be integrated on a single semiconductor chip. Alternatively, the central processing unit, the purge controller, and the cache memory controller may be fabricated on individual semiconductor chips. In another implementation, all of the system components may be separately assembled.

What is claimed is:

1. A data processing system comprising
a) a pre-fetch cue register system having a plurality of memory locations for storing a plurality of instruction codes,
b) a data register means for storing a data code,
c) a main memory system for storing instruction codes,
d) a first instruction decoder sequentially supplied with said instruction codes from said main memory system, and producing control signals from said instruction codes,
e) a cache memory system storing a plurality of data blocks having data blocks each storing a plurality of data codes, and communicating with said data register and said main memory system through a first bus and a second bus, respectively,
f) a second instruction decoder operative to check instruction codes stored in said pre-fetch cue register system to see whether or not the communication between said data register, said main memory system and said cache memory system is predicted, said second instruction decoder being further operative to check said instruction codes stored in said pre-fetch cue register system to see whether or not a bus request for at least one of said first and second buses is predicted,
g) a pointer supplying an auxiliary address code indicative of an address assigned to one of said data blocks each storing said plurality of data codes to said cache memory system while said communication between said data register, said main memory system and said cache memory system is not predicted, said cache memory system checking said data blocks sequentially indicated by said auxiliary address code to see whether or not at least one of said plurality of data codes is supplied from said data register, and
h) purge means for allowing said cache memory system to transfer said at least one of said plurality of data codes to said main memory system in absence of any predicted said communication between said data register, said main memory system and said cache memory system, and of any predicted said bus request.

2. A data processing system as set forth in claim 1, in which said cache memory system comprises e-1) a cache memory unit having a plurality of memory locations each storing one of said plurality of data blocks, and e-2) a cache memory controller associated with said cache memory unit, and operative to carry out a first data transfer from said cache memory unit to said data register means if a data code to be requested is stored in said cache memory unit, said cache memory controller being further operative to carry out a second data transfer from said main memory system to said cache memory unit followed by said first data transfer if a data code to be requested is not stored in said cache memory unit, said cache memory controller being further operative to transfer said at least one of said plurality of data codes to said main memory system in the absence of any predicted said communication between said data register, said main memory system, and said cache memory system and of any predicted said bus request.

3. A data processing system as set forth in claim 2, in which said purge comprises f-1) a logic gate enabled with an enable signal indicative of presence of said at least one of said data codes and supplied from said cache memory system, and responsive to a detection signal indicative of said absence of any prediction of said communication between said data register, said main memory system and said cache memory system and of said bus request for producing a purge instruction signal, f-2) a bus controller associated with said first and second buses, and responsive to said purge instruction signal for allowing said cache memory controller to transfer said at least one of said plurality of data codes to said main memory system.

4. A data processing system as set forth in claim 3, in which at least a branch instruction and a memory access instruction are causative of said absence of any predicted said communication between said data register, said main memory system, and said cache memory system and of any predicted said bus request.

5. A data processing system comprising:
   a) a central processing unit having
      a-1) an address register for storing an effective address code,
      a-2) a pre-fetch instruction cue register system having a plurality of stages respectively storing instruction codes,
      a-3) a first instruction decoder sequentially supplied with said instruction codes from said pre-fetch instruction cue register system, and producing control signals,
      a-4) data register means for storing at least one of a data code externally supplied and a data code internally produced, and
      a-5) operand register means responsive to at least one of said control signals, and able to produce said data code internally produced, based on said data code externally supplied;
   b) a main memory system storing a plurality of data codes;
   c) a cache memory system having
      c-1) a cache memory unit storing a plurality of addressable data blocks each having data codes, and
      c-2) a cache memory controller responsive to said effective address code supplied from said address register for transferring a requested data code from one of said addressable data blocks to said data register means, said cache memory controller being further operative to request said main memory system to supply said requested data code to said cache memory unit for transferring said requested data code to said data register means if said requested data code is not stored in said cache memory unit, said cache memory controller being responsive to an auxiliary address code indicative of one of said addressable data blocks for producing a first enable signal and a prohibiting signal both indicative of presence of a data code written by said central processing unit;
   d) a bus controller for controlling communication between said central processing unit, said main memory system and said cache memory system; and
   e) a purge controller having
      e-1) a second instruction decoder monitoring said instruction codes stored in said pre-fetch cue register system for producing a detection signal indicative of a prediction of a bus cycle or a communication between said central processing unit, said main memory system and said cache memory system and a second enable signal indicative of absence of said predicted communication between said central processing unit, said main memory system and said cache memory system,
      e-2) a pointer responsive to said second enable signal in absence of said prohibiting signal for incrementing said auxiliary address code, said pointer never incrementing said auxiliary address code in presence of said prohibiting signal,
      e-3) a multiplexer responsive to said detection signal for selectively transferring said effective address code and said auxiliary address code to said cache memory system, and
      e-4) a logic gate responsive to said first enable signal for producing a purge instruction signal based on said detection signal, said bus controller being responsive to said purge instruction signal for allowing said cache memory controller to transfer said data code written by said central processing unit to said main memory system.

6. A cache memory system associated with a data register means, a pre-fetch cue register system for storing instruction codes and with a main memory system, comprising:
   a) a cache memory sub-system having
      a-1) a cache memory unit storing a plurality of addressable data blocks each having data codes, and
      a-2) a cache memory controller responsive to an effective address code for transferring a requested data code from one of said addressable data blocks to said data register means, said cache memory controller being further operative to request said main memory system to supply said requested data code to said cache memory unit for transferring said requested data code to said data register means if said requested data code is not stored in said cache memory unit, said cache memory controller being responsive to an auxiliary address code indicative of an address assigned to one of said addressable data blocks for producing a first enable signal and a prohibiting signal both indicative of presence of a data code written by said central processing unit; and
   b) a purge controller having
      b-1) an instruction decoder monitoring said instruction codes stored in said pre-fetch cue register system for producing a detection signal indicative of at least one of a predicted bus cycle and a predicted communication between said data register means, said main memory system and said cache memory sub-system, and a second enable signal indicative of absence of any of said predicted bus cycle and communication between said data register means, said main memory system and said cache memory sub-system, b-2) a pointer responsive to said second enable signal in absence of said prohibiting signal for incrementing said auxiliary address code, said pointer never incrementing said auxiliary address code in presence of said prohibiting signal, b-3) a multiplexer responsive to said detection signal for selectively transferring said effective address code and said auxiliary address code to said cache memory sub-system, and b-4) a logic gate responsive to said first enable signal for producing a purge instruction signal based on said detection signal for allowing said cache memory controller to transfer a data code written into said cache memory unit by said central processing unit to said main memory system.

* * * * *

UNITED STATES PATENT AND TRADEMARK OFFICE
CERTIFICATE OF CORRECTION

PATENT NO. : 5,412,790
DATED : May 2, 1995
INVENTOR(S) : Atsushi Okamura

It is certified that error appears in the above-indentified patent and that said Letters Patent is hereby corrected as shown below:

Column 6, line 10, change "19c" to --19b--.

Column 7, line 64, change "1,547" to --1.547--.

Signed and Sealed this

Third Day of October, 1995

BRUCE LEHMAN

*Attest:*

*Attesting Officer*   *Commissioner of Patents and Trademarks*